US006434952B2

(12) United States Patent
Wagner

(10) Patent No.: US 6,434,952 B2
(45) Date of Patent: Aug. 20, 2002

(54) FREEZER HEAD FOR PIPE FREEZING DEVICES

(75) Inventor: Rudolf Wagner, Stuttgart (DE)

(73) Assignee: REMS-WERK Christian Föll und Söhne GmbH & Co., Waiblingen (DE)

( * ) Notice: Subject to any disclaimer, the term of this patent is extended or adjusted under 35 U.S.C. 154(b) by 0 days.

(21) Appl. No.: 09/735,221

(22) Filed: Dec. 12, 2000

(30) Foreign Application Priority Data

Dec. 13, 1999 (DE) .......................... 199 60 126

(51) Int. Cl.$^7$ ................................ F25D 3/00
(52) U.S. Cl. ................................ 62/66; 62/293
(58) Field of Search ............... 62/293, 66; 137/13, 137/251.1; 165/80.1

(56) References Cited

U.S. PATENT DOCUMENTS 4,267,699 A  *  5/1981  Bahrenburg ................ 62/293
4,428,204 A  *  1/1984  Brister ...................... 62/293
4,944,161 A  *  7/1990  Van Der Sanden ........... 62/293
5,548,965 A  *  8/1996  Chen et al. .................. 62/293
5,680,770 A  * 10/1997  Hall et al. ................... 62/293
5,836,167 A  * 11/1998  Clouston et al. ............. 62/293

* cited by examiner

Primary Examiner—William C. Doerrler
Assistant Examiner—Mohammad M Ali
(74) Attorney, Agent, or Firm—Gudrun E. Huckett

(57) ABSTRACT

A freezer head for pipe freezing devices has a casing having a first exterior side with one or more first exterior depressions for receiving a pipe section to be frozen. The casing has a second exterior side with one or more second exterior depressions. The casing has a hollow interior. The casing has at least one connector configured to supply a cooling medium into the hollow interior. The first depression has a bottom having at least a first bottom portion and a second bottom portion, wherein each one of the first and second bottom portions has a different radius of curvature. The second depression has a bottom having at least a first bottom portion and a second bottom portion, wherein each one of the first and second bottom portions has a different radius of curvature.

23 Claims, 2 Drawing Sheets

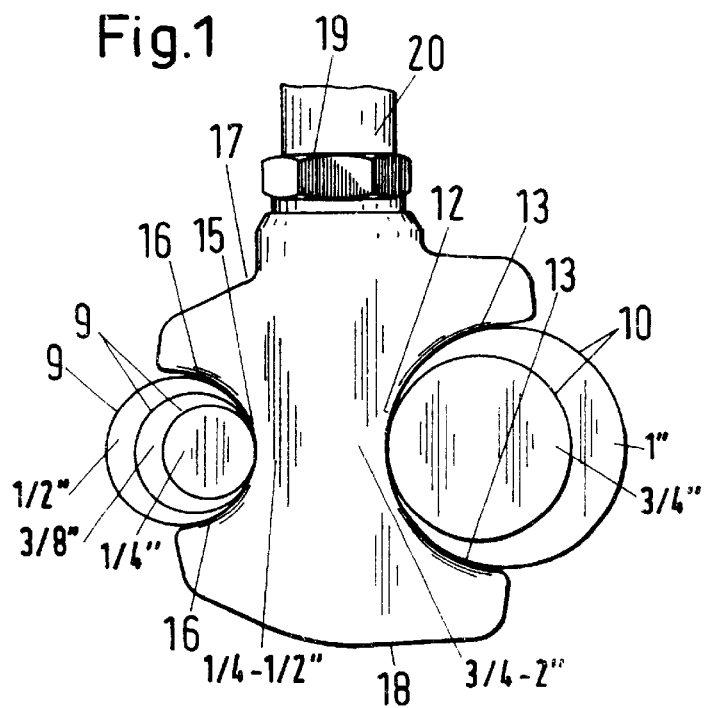
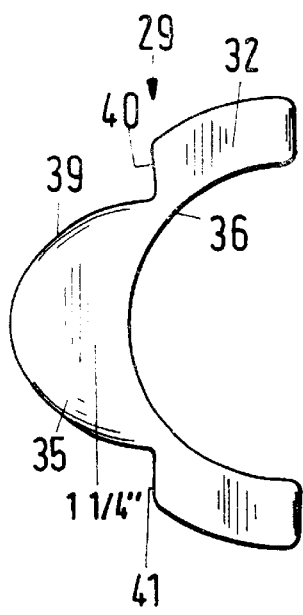
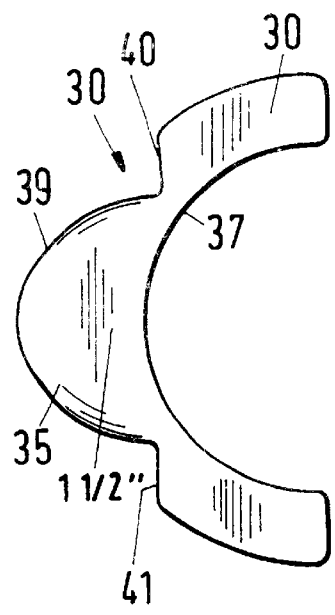
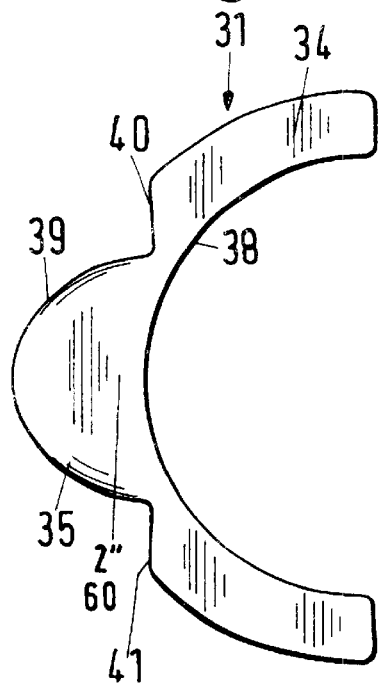

FREEZER HEAD FOR PIPE FREEZING DEVICES

BACKGROUND OF THE INVENTION

1. Field of the Invention

The invention relates to a freezer head for pipe freezing devices comprising at least one depression provided in an exterior side of the freezer head for receiving a pipe section and with at least one connector for supplying a cooling medium into the hollow interior of the freezer head.

2. Description of the Related Art

Such freezer heads are used to freeze the contents of a pipe, for example, of a heating pipe in order to be able to repair the pipe or exchange individual pipe sections. The freezer head is provided with a depression and is placed with the depression onto the pipe section so that the bottom of the depression rests areally on the pipe. The cooling medium introduced into the freezer head evaporates so that heat is removed from the pipe section and its contents is frozen.

In a known freezer head (DE 196 17 619 C2) several depressions are provided at the circumference. They are separated from one another by wing-like stays which extend radially outwardly from a central area of the freezer head. The bottom areas of the depressions have different radii of curvature so that the freezer head can be placed with a matching depression onto the corresponding pipe section. However, because of the wing-shaped stays, the freezer head has a complex configuration. Moreover, the radially extending stays, in particular, when the depressions are relatively deep, are narrow so that there is the risk that these stays will be damaged.

SUMMARY OF THE INVENTION

It is an object of the present invention to develop a freezer head of the aforementioned kind such that it is of a compact design, has a high stability, and can still be used for different pipe sections.

In accordance with the present invention, this is achieved in that the freezer head is provided at another exterior side with at least one additional depression and that the bottom of the depressions has two bottom portions, respectively, which bottom portions have different radii of curvature.

The bottom of each depression of the freezer head according to the invention is provided with two differently curved bottom portions. According to the different radii of curvature of the bottom portions, the depressions can receive pipe sections of different diameters. Since the depressions are provided on different exterior sides of the freezer head, preferably at opposite exterior sides, the freezer head according to the invention is of a compact configuration. In particular, it has no wing-like stays which can be easily damaged. Accordingly, the freezer head has a high strength which makes it suitable, in particular, for the rough use on construction sites.

BRIEF DESCRIPTION OF THE DRAWING

In the drawing:

FIG. 1 is an end view of the freezer head according to the invention;

FIG. 6 is a side view of a first embodiment of an insert according to the invention;

FIG. 7 is a side view of a second embodiment of an insert according to the invention; and FIG. 8 is a side view of a third embodiment of an insert according to the invention.

DESCRIPTION OF THE PREFERRED EMBODIMENTS

The freezer head is a component of a pipe freezing device with which the pipe contents, usually water, can be frozen.

For this purpose, two freezer heads are fastened to the pipe section. Lines are attached to the freezer heads which connect the freezer heads to a cooling device which usually comprises a compressor, a condenser and a blower. A cooling medium which is introduced via the lines into the freezer heads is circulated under pressure within the cooling system. The liquid cooling medium which is pressurized under high pressure is introduced via a thin capillary tube into the freezer heads. When exiting the thin capillary tube, the cooling medium evaporates so that heat is absorbed from the neighboring area of the pipe to be frozen. This has the results that the pipe contents will freeze. The cooling medium vapor is removed via an outer pipe of the lines surrounding the capillary tube to the cooling device and returned to the compressor in which the cooling medium vapor is compressed. The cooling medium vapor which is now under high pressure is then cooled by means of the condenser and optionally by the blower and is thus returned into the liquid phase. The liquid cooling medium is then again recirculated in the described manner into the freezer heads. The operation of this cooling system is known and is therefore not explained in more detail in this context.

Figure 3:
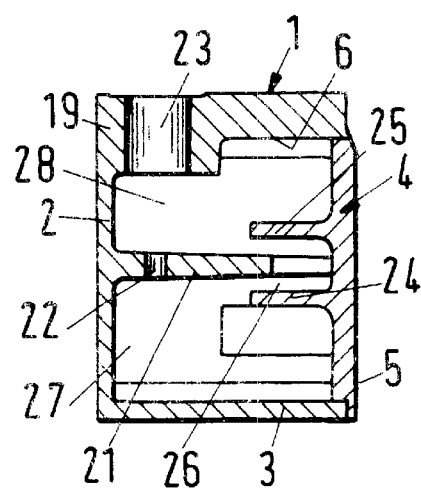
FIG. 3 is a section along the line III—III of FIG. 2.

The freezer head has a casing 1 with a casing bottom 2 having connected thereto a perpendicularly extending peripheral casing sidewall 3. The casing 1 also comprises a cover 4 which has the same contour shape as the casing 1 and closes off the hollow interior of the casing 1. As is illustrated in FIG. 3, the cover 4 with its peripheral edge 5 rests at least with a portion of its height at the inner wall 6 of the sidewall 3 of the casing 1. The casing 1 and the cover 4 are advantageously connected by welding and are comprised of a material with good heat-conducting properties, such as metal.

The freezer head is provided at two oppositely positioned longitudinal sides with groove-shaped depression 7 and 8, respectively. The pipes or pipe sections 9 and 10 (FIG. 1) to be frozen are inserted into these depressions 7, 8. The depression 7 has a curved inner side or bottom 11 which is comprised of two bottom portions 12 and 13 of different curvature. The central bottom portion 12 has a smaller radius of curvature than the adjoining bottom portion 13. In the disclosed embodiment the central bottom portion 12 has a radius corresponding to a three-quarter inch pipe. Accordingly, the freezer head can be placed with the depression 7 onto a pipe having a diameter of three-quarter inch. The freezer head then rests with its bottom portion 12 areally (with its surface area) against the corresponding pipe section 10 (FIG. 1). The width of the bottom portion 12 measured in the direction of curvature is selected such that the contents of the pipe section 10 is frozen within a short period of time.

The freezer head can be positioned with its depression 7 also on a pipe section 10 having a greater diameter. In the illustrated embodiment according to FIG. 1 this larger pipe has a diameter of 1 inch. In this case, the freezer head is positioned with its bottom portion 13 areally on the circumference of the pipe section 10 with the larger diameter. It is understood that the bottom portion 13 is comprised of two individual areas adjoining the bottom portion 12. The two areas are located on a common imaginary circular arc or a cylinder mantle surface. The bottom portion 13 has such a length in the direction of curvature that a quick heat transmission from the freezer head to the pipe section 10 is ensured.

The oppositely positioned depression 8 has also a curved inner side or bottom 14 with two bottom portions 15 and 16 of different curvature. The bottom portion 15 is provided centrally in the depression 8 and has a smaller radius of curvature than the adjoining individual areas of the bottom portion 16. The radii of curvature of the bottom portions 15 and 16 are moreover smaller than the radii of curvature of the bottom portions 12, 13 of the oppositely positioned depression 7.

As is illustrated in FIG. 1 in an exemplary fashion, the freezer head can be placed with the depression 8 onto a pipe section having a diameter of a ¼ inch. In this case, the freezer head with the bottom portion 15 rests areally against this pipe. The freezer head can be placed with the bottom portion 16, which adjoins both ends of the bottom portion 15 and whose two areas are positioned on a common imaginary circular arc or cylinder mantle surface, onto a pipe section 9 having a larger diameter which can be, for example, a diameter of ½ inch. In each case it is ensured by means of the bottom portions 15, 16 located on circular. arcs that the freezer head will rest against the respective pipe with areal contact.

The two depressions 7, 8, which are provided on oppositely positioned longitudinal sides of the freezer head, have two differently curved bottom portions 12, 13 and 15, 16 in the illustrated embodiment. It is possible in a simple variation to provide one or the other depression or both depressions 7, 8 with more than two differently curved bottom portions. In this case, the freezer head can be placed onto a corresponding number of pipe sections of different diameters. Since the different bottom portions of each depression 7, 8 are positioned on imaginary circular arcs, the freezer head will rest areally on the respective pipe sections 9, 10 so that an optimal heat transmission is ensured. Since the freezer head has only one depression 7, 8 on each longitudinal side, it has a very compact configuration. The freezer head can therefore also be placed onto the pipes in narrow spaces. Despite this compact configuration, the freezer head can be placed optimally onto pipes or pipe section 9, 10 having different diameters because of the differently curved bottom portions 12, 13; 15, 16 provided on the freezer head.

Narrow sides 17 and 18 adjoin the longitudinal sides of the freezer head and are inclined in opposite directions so as to extend toward one another (see FIG. 1). The narrow sides 17, 18 diverge from the longitudinal side having the depression 8 in the direction toward the longitudinal side with the depression 7. This slanted position of the narrow sides 17, 18 relative to the longitudinal sides contributes to a compact configuration and provides for a simple handling of the device. As a result of this slanted position of the narrow sides 17, 18, the freezer head is narrower in the area of the smaller depression 8 which is configured to receive pipes of smaller diameters than the depression 7 at the opposite side.

The narrow side 17 has a connector 19 to which a line 20 (FIG. 1) for the cooling medium is connected. It comprises in a manner known in the art a capillary inner tube, via which the cooling medium is introduced into the freezer head, as well as an outer pipe, which surrounds the inner capillary tube and in which the cooling medium vapor can be transported out of the freezer head back to the cooling device.

Figure 2:
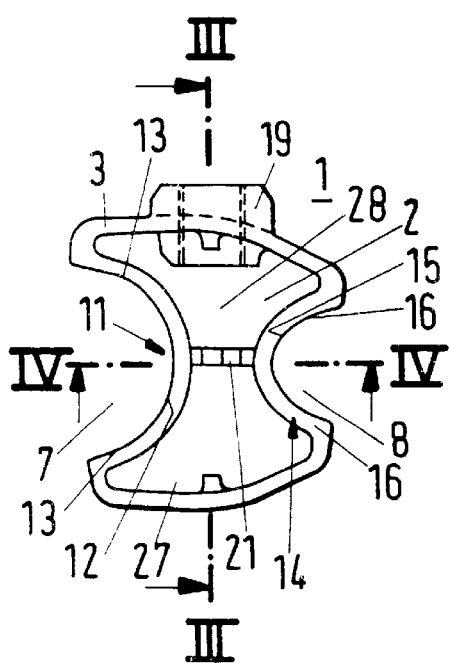
FIG. 2 is an end view of the casing of the freezer head of the invention as illustrated in FIG. 1.
Figure 5:
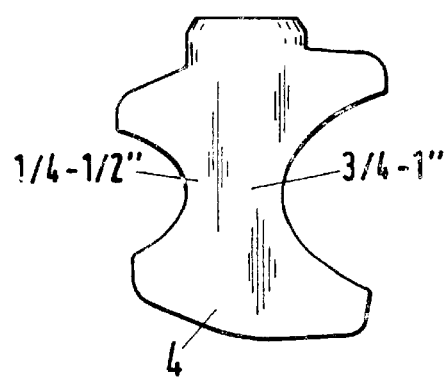
FIG. 5 is a plan view of the cover of the freezer head according to the invention.

The two depressions 7, 8 are positioned opposite one another on the two longitudinal sides of the freezer head. Accordingly, the freezer head has its smallest width in the area between the deepest locations of the depressions 7, 8 (FIGS. 1, 2, and 5). Advantageously, the casing sidewall 3 has over its periphery a constant thickness. The casing sidewall 3 is thicker only in the area of the connector 19. In order to ensure an optimal heat transmission to the pipe section 9, 10, the casing sidewall 3 is advantageously thin. It is, of course, also possible that the casing sidewall 3 has different thicknesses about its circumference. In this connection, it is advantageous when the casing sidewall 3 in the area of the bottoms 11, 14 is of a thin-walled construction in order to provide a good heat transmission. The casing sidewall 3 can have a greater wall thickness in the other areas.

The differently curved bottom portions 12, 13; 15, 16 are provided in the sidewall 3 of the casing 1. The depressions 7, 8 extend over the entire height of the casing sidewall 3.

Figure 4:
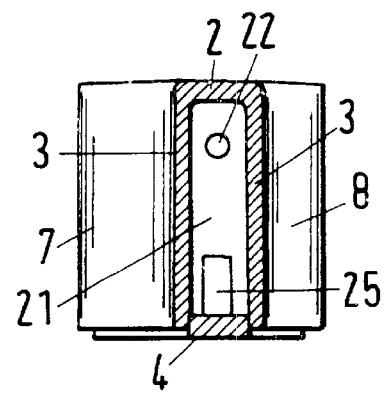
FIG. 4 is a section along the line IV—IV of FIG. 2.

In the area of the deepest location of the two depressions 7, 8, the opposite portions of the casing sidewall are connected by a transverse stay 21. As illustrated in FIG. 3, the transverse stay 21 extends from the casing bottom 2 of the casing 1 perpendicularly in the direction toward the cover 4. In the vicinity of the casing bottom 2, the transverse stay 21 is provided with a through opening 22 whose axis is aligned with the axis of the through opening 23 in the connector 19. The through opening 22 provided in the transverse stay 21 has a significantly smaller diameter than the through opening 23 of the connector 19 because only the capillary tube (not illustrated) for supplying the pressurized liquid cooling medium must pass through the through opening 22. The transverse stay 21 ends at a spacing to the cover 4 (FIG. 3). It essentially divides the hollow interior of the freezer head into two chambers 27, 28. Two stays 24 and 25 extend perpendicularly from the inner side of the cover 4 and are positioned laterally spaced relative to the transverse stay 21 on opposite sides of the transverse stay 21 (see FIG. 3). The two stays 24, 25 have a length extending past the free end of the transverse stay so that they overlap the transverse stay when viewed in a direction transverse to the longitudinal extension of the stays 21, 24, 25 (FIG. 3). Accordingly, between the transverse stay 21 and the two stays 24, 25 provided at the cover 4, a labyrinth passage 26 is formed via which the cooling medium vapor can flow from the chamber 27 into the chamber 28. The liquid cooling medium is introduced via a capillary tube (not shown) passing through the through opening 22 into the chamber 27 which is separated by the transverse stay 21 from the chamber 28 into which the connector 19 opens. The pressurized liquid cooling medium evaporates in the chamber 27 when exiting the capillary pipe, and the resulting cooling medium vapor flows via the labyrinth passage 26 into the chamber 28 from which it is removed via the outer pipe (not shown) of the line 20. The transverse stay 21 which is provided in the central area of the freezer head provides a high strength to the freezer head. The stays 24, 25 have a rectangular contour (FIG. 4) in a plan view and are formed as narrow tongues which are advantageously monolithic parts of the plate-shaped cover 4.

The transverse stay 21 with the labyrinth passage 26 contributes to an optimal evaporation of the cooling medium and an optimal cooling. The cooling medium vapor cannot pass from the chamber 27 immediately into the chamber 28. It is held back by the labyrinth passage 26 and can thus only slowly flow into the chamber 28. In this way, an excellent heat transmission is ensured, in particular, independent of the position of the freezer head.

The two chambers 27, 28 have essentially the same contour but are mirror-symmetrically positioned relative to one another (FIG. 2).

In order to be able to use the freezer head also for pipes of a larger diameter, inserts 29 to 31 (FIGS. 6 to 8), which are substantially of identical design and differ only with respect to their receiving parts 32 to 34, can be inserted, for example, into the depression 7. Each insert 29 to 31 has an insertion member 35 which is advantageously of a solid (not hollow) construction and has a contour matched to the contour of the depression 7. The insertion members 35 of the inserts 29 to 31 are of identical configuration and rest in their position of use areally on the bottom 11 of the depression 7. The receiving part 32 to 34 of the inserts 29 to 31 adjoins the bracket-shaped insertion member 35. The inner sides 36 to 38 of the receiving parts 32 to 34 are curved like a circular arc and extends approximately about 180°, respectively. The inner side 36 has the smallest and the inner side 38 the greatest radius of curvature. The radii of curvature of the inner sides 36 to 38 are selected such that the insert 29 is suitable for a pipe having a diameter of 1 1/14 in., the insert 30 for a pipe having a diameter of 1 1/2 in., and the insert 31 for a pipe having a diameter of 2 in. The freezer head rests with its inner side 36 to 38 of the receiving part 32 to 34 of the respective insert 29 to 31 areally on the respective pipe. The exterior 39 of the insertion member 35 has a transition into an outwardly extending, advantageously planar, outer side 40,41 of the receiving part 32 to 34, respectively. With this outer side 40, 41, the insert 29 to 31 rests against the longitudinal side of the freezer head provided with the depression 7. By means of the inserts, the range of application of the freezer head is expanded. The inserts 29 to 31 are comprised of a material of good heat-conducting properties, preferably of metal.

The inner sides 36 to 38 of the receiving part 32 to 34 can have differently curved bottom portions corresponding to the design of the bottoms 11, 14 of the depressions 7, 8. Accordingly, the receiving part 32 to 34 can also receive pipes of different diameters.

The freezer head is fastened before the freezing process on the respective pipe section 9, 10 by means of holders (not shown), which are, for example, in the form of tightening straps to be wrapped around the pipe and the freezer head. The pipe sections 9, 10 to be frozen can be comprised of steel, copper, plastic material, or a composite material.

While specific embodiments of the invention have been shown and described in detail to illustrate the inventive principles, it will be understood that the invention may be embodied otherwise without departing from such principles.

What is claimed is:

1. A freezer head for pipe freezing devices, said freezer head comprising:
   a casing (1) having a first exterior side with one or more first exterior depressions (7) configured to receive a pipe section to be frozen;
   said casing (1) having a second exterior side with one or more second exterior depressions (8);
   said casing (1) having a hollow interior (27, 28);
   said casing (1) having at least one connector (19) configured to supply a cooling medium into said hollow interior (27, 28);
   wherein said first depression (7) has a bottom (11) comprised at least of a first bottom portion (12) and a second bottom portion (13), wherein each one of said first and second bottom portions (12, 13) has a different radius of curvature;
   wherein said second depression (8) has a bottom (14) comprised at least of a first bottom portion (15) and a second bottom portion (16), wherein each one of said first and second bottom portions (15, 16) has a different radius of curvature.

2. The freezer head according to claim 1, wherein said first and second bottom portions (12, 13) of said first depression (7) have a transition into one another and wherein said first and second bottom portions (15, 16) of said second depression (8) have a transition into one another.

3. The freezer head according to claim 1, wherein said first bottom portion (12) of said first depression (7) is centrally arranged in said bottom (11) of said first depression (7) and wherein said first bottom portion (15) of said second depression (8) is centrally arranged in said bottom (14) of said second depression (8).

4. The freezer head according to claim 3, wherein said second bottom portion (13) of said first depression (7) is arranged on opposite ends of said first bottom portion (12) of said first depression (7) and wherein said second bottom portion (16) of said second depression (8) is arranged on opposite ends of said first bottom portion (15) of said second depression (8).

5. The freezer head according to claim 4, wherein said second bottom portion (13) of said first depression (7) is comprised of two individual first areas separated by said first bottom portion (12) of said first depression (7) and wherein said two individual first areas are located on a common imaginary circular arc, and wherein said second bottom portion (16) of said second depression (8) is comprised of two individual second areas separated by said first bottom portion (15) of said second depression (8) and wherein said two individual second areas are located on a common imaginary circular arc.

6. The freezer head according to claim 3, wherein said radius of curvature of said first bottom portion (12) of said first depression (7) is smaller than said radius of curvature of said second bottom portion (13) of said first depression (7), and wherein said radius of curvature of said first bottom portion (15) of said second depression (8) is smaller than said radius of curvature of said second bottom portion (16) of said second depression (8).

7. The freezer head according to claim 1, wherein said first and second exterior sides are positioned opposite one another and wherein said first exterior side has one said first exterior depression (7) and wherein said second exterior side has one said second exterior depression (8).

8. The freezer head according to claim 1, wherein said casing (1) has a casing bottom (2) and a casing sidewall (3) connected to an edge of said casing bottom (2) and projecting transversely from said casing bottom (2).

9. The freezer head according to claim 8, wherein said casing sidewall (3) comprises said first and second exterior sides such that said first and second depressions (7, 8) are located in said casing sidewall (3).

10. The freezer head according to claim 8, wherein said casing sidewall (3) delimits said hollow interior (27, 28).

11. A freezer head for pipe freezing devices, said freezer head comprising:
   a casing (1) having a first exterior side with one or more first exterior depressions (7) configured to receive a pipe section to be frozen;
   said casing (1) having a second exterior side with one or more second exterior depressions (8);

said casing (1) having a hollow interior (27, 28);

said casing (1) having at least one connector (19) configured to supply a cooling medium into said hollow interior (27, 28);

wherein said first depression (7) has a bottom (11) comprised at least of a first bottom portion (12) and a second bottom portion (13), wherein each one of said first and second bottom portions (12, 13) has a different radius of curvature;

wherein said second depression (8) has a bottom (14) comprised at least of a first bottom portion (15) and a second bottom portion (16), wherein each one of said first and second bottom portions (15, 16) has a different radius of curvature;

wherein said casing (1) has a casing bottom (2) and a casing sidewall (3) connected to an edge of said casing bottom (2) and projecting transversely from said casing bottom (2); and comprising a transverse stay (21) arranged in said hollow interior, wherein said hollow interior comprises two chambers (27, 28) separated from one another at least partially by said transverse stay (21).

12. The freezer head according to claim 11, wherein said transverse stay (21) is connected to said casing bottom (2) and projects transversely form said casing bottom (2).

13. The freezer head according to claim 12, wherein said casing (1) has a cover (4) connected to said casing sidewall (3) opposite said casing bottom (2) and closing off said hollow interior (27, 28), wherein said transverse stay (21) ends at a spacing from said cover (4).

14. The freezer head according to claim 13, further comprising two stays (24, 25) connected to said cover (4) and projecting into said hollow interior (27, 28) at a lateral spacing to said transverse stay (21), wherein said two stays (24, 25) project in a direction toward said casing bottom (21) past an end of said transverse stay (21).

15. The freezer head according to claim 14, wherein said two stays (24, 25) and said transverse stay (21) from a labyrinth passage (26).

16. The freezer head according to claim 11, wherein said transverse stay (21) has a through opening (22) configured to accommodate a line supplying the cooling medium into said hollow interior (27, 28).

17. The freezer head according to claim 11, wherein said first depression (7) and said second depression (8) are positioned opposite one another and wherein said transverse stay (21) is connected between said first and second depressions (7, 8).

18. A freezer head for pipe freezing devices, said freezer head comprising:

a casing (1) having a first exterior side with one or more first exterior depressions (7) configured to receive a pipe section to be frozen;

said casing (1) having a second exterior side with one or more second exterior depressions (8);

said casing (1) having a hollow interior (27, 28);

said casing (1) having at least one connector (19) configured to supply a cooling medium into said hollow interior (27, 28);

wherein said first depression (7) has a bottom (11) comprised at least of a first bottom portion (12) and a second bottom portion (13), wherein each one of said first and second bottom portions (12, 13) has a different radius of curvature;

wherein said second depression (8) has a bottom (14) comprised at least of a first bottom portion (15) and a second bottom portion (16), wherein each one of said first and second bottom portions (15, 16) has a different radius of curvature; and further comprising at least one insert (29–31) configured to be inserted into at least one of said first and second depressions (7, 8), wherein said at least one insert (29–31) has a receiving part (32–34) configured to receive a pipe section to be frozen, wherein the receiving part (32–34) is configured to accommodate a pipe section having a diameter larger than a diameter of pipe sections accommodated in said first and second depressions (7, 8).

19. The freezer head according to claim 18, wherein said receiving part (32–34) is bracket-shaped.

20. The freezer head according to claim 18, wherein said receiving part (32–34) has an inner side (36–38) having at least one part-circular bottom area.

21. The freezer head according to claim 20, wherein said bottom (36–38) has two bottom areas of different curvature.

22. The freezer head according to claim 18, wherein said insert (29–31) has an insertion member (35) configured to engage one of said first and second depressions (7, 8).

23. The freezer head according to claim 22, wherein said insertion member (35) has an outer side (39–41) matching a curved inner side of one of said first and second depressions (7, 8).

* * * * *